Patented July 2, 1935

2,006,416

UNITED STATES PATENT OFFICE 2,006,416

SAFETY GLASS

John K. Speicher, Wilmington, Del., assignor to Hercules Powder Company, Wilmington, Del., a corporation of Delaware No Drawing. Application July 31, 1931, Serial No. 554,384

11 Claims. (Cl. 49—81.5)

This invention relates to an improvement in safety glass, such as is widely used where a non-shatterable glass is desired, as for example, in automobiles.

Safety glass, as is well known, comprises a plurality of sheets of glass, usually two, bonded together through the medium of one or another form of plastic composition in sheet form, as for example, cellulose ester plastic, as celluloid. This safety glass is in effect a laminated structure involving sheets of glass in superimposed relation with an intermediate sheet or layer of plastic by which the sheets of glass are bonded together and by which, since the plastic is flexible and adhered to the glass, shattering of the glass with a scattering of glass fragments is avoided.

Safety glass as heretofore produced has proved generally satisfactory and of great value in connection with its primary purpose, i. e. avoidance of shattering when broken, but heretofore has been open to a number of serious objections, chief among which is that it becomes relatively rapidly discolored from the action of sunlight, due to the discoloring (yellowing) effect of sunlight on plastics heretofore used to bond the sheets of glass together.

Now it is the object of this invention to provide a safety glass which will effectively resist discoloration over a relatively long period and in which the bond between the glass elements and the bonding plastics will be effectively maintained.

More particularly, the safety glass in accordance with this invention will comprise a plurality of sheets of glass, usually two, bonded together through the medium of a plastic composition containing an alkyl phosphate.

The plastic composition generally speaking may contain any suitable base, as a cellulose ester or ether, as for example, nitrocellulose, cellulose acetate, ethyl cellulose, etc. while the alkyl phosphate, which will act as a plasticizer, may be any alkyl ester of phosphoric acid, as a monohydric alcohol ester, as tri-butyl phosphate, tri-amyl phosphate, tri-propyl phosphate, and the like.

The plastic composition may be prepared in any desired way known to the art and formed or cut into sheets. A plastic sheet is then moistened with a solvent, placed between sheets of glass and the glass pressed into adherence with the plastic sheet, or in any other well known or desired manners.

As illustrative, for example, a satisfactory plastic in accordance with this invention may be produced in accordance with the following formula:

| | Parts |
|---|---|
| Nitrocellulose | 100 |
| Tri-butyl phosphate | 10 |
| Acetone | 25 |
| Alcohol | 50 |

The ingredients are mixed in a mixer until the tri-butyl phosphate is thoroughly incorporated and the nitrocellulose completely colloided. The mass is then processed as in the manufacture of celluloid, cut into sheets and is then ready for use for the manufacture of safety glass as indicated or by any known method.

Safety glass made with the use of the plastic composition described above will show only a slight yellowing after 200 hours exposure to mercury arc radiation as compared with a dark brown color shown by a sample of safety glass made from regular celluloid.

It will be understood that the formula given above is illustrative only, since the use of any suitable base, solvent, etc. and of various alkyl phosphates and in various proportions is contemplated as within the scope of this invention.

What I claim and desire to protect by Letters Patent is:

1. Safety glass including in combination a plurality of sheets of glass bonded together through the medium of a layer of plastic composition containing an alkyl phosphate.

2. Safety glass including in combination a plurality of sheets of glass bonded together through the medium of a layer of plastic composition containing a cellulose ester and an alkyl phosphate.

3. Safety glass including in combination a plurality of sheets of glass bonded together through the medium of a layer of plastic composition containing a cellulose ester and a monohydric alcohol ester of phosphoric acid.

4. Safety glass including in combination a plurality of sheets of glass bonded together through the medium of a layer of plastic composition containing nitrocellulose and an alkyl phosphate.

5. Safety glass including in combination a plurality of sheets of glass bonded together through the medium of a plastic composition containing a cellulose ester and tri-propyl phosphate.

6. Safety glass including in combination a plurality of sheets of glass bonded together through the medium of a layer of plastic composition containing a cellulose ester and tri-butyl phosphate.

7. Safety glass including in combination a plurality of sheets of glass bonded together through the medium of a plastic composition containing a cellulose ester and tri-amyl phosphate.

8. Safety glass including in combination a plurality of sheets of glass bonded together through the medium of a plastic composition containing nitrocellulose and tri-propyl phosphate.

9. Safety glass including in combination a plurality of sheets of glass bonded together through the medium of a layer of plastic composition containing nitrocellulose and tri-butyl phosphate.

10. Safety glass including in combination a plurality of sheets of glass bonded together through the medium of a plastic composition containing nitrocellulose and tri-amyl phosphate.

11. Safety glass including in combination a plurality of sheets of glass bonded together through the medium of a layer of plastic composition containing cellulose acetate and an alkyl phosphate.

JOHN K. SPEICHER.